United States Patent [19]

Chuma et al.

[11] Patent Number: 4,779,146
[45] Date of Patent: Oct. 18, 1988

[54] APPARATUS FOR AND METHOD OF WRITING/READING DATA INTO/FROM A FLEXIBLE DISK

[75] Inventors: Akira Chuma; Kazuo Nakagoshi, both of Odawara; Yoshihiro Moribe, Chigasaki; Noriaki Miniamide, Odawara, all of Japan

[73] Assignee: Hitachi, Ltd., Tokyo, Japan

[21] Appl. No.: 877,207

[22] Filed: Jun. 23, 1986

[30] Foreign Application Priority Data

Jul. 17, 1985 [JP] Japan ................................ 60-156133

[51] Int. Cl.⁴ ............................ G11B 5/09; G11B 5/03
[52] U.S. Cl. ......................................... 360/48; 360/66
[58] Field of Search .................. 360/66, 118, 121, 48, 360/46, 61, 68, 50

[56] References Cited

U.S. PATENT DOCUMENTS

| | | | |
|---|---|---|---|
| 2,628,287 | 2/1953 | Haynes | 360/66 |
| 2,736,776 | 2/1956 | Camras | 360/118 |
| 3,514,851 | 6/1970 | Perkins | 360/118 |
| 3,668,332 | 6/1972 | Anderson | 360/118 |
| 3,900,894 | 8/1975 | Aziz | 360/66 |
| 4,164,781 | 8/1979 | Brown | 360/118 |
| 4,290,088 | 9/1981 | Beecroft | 360/61 |
| 4,466,027 | 8/1984 | Howellerzi | 360/66 |
| 4,616,273 | 10/1986 | Ishii et al. | 360/66 |
| 4,633,337 | 12/1986 | Horie et al. | 360/61 |

Primary Examiner—Vincent P. Canney
Attorney, Agent, or Firm—Antonelli, Terry & Wands

[57] ABSTRACT

A method of first erasing the full width of a recording track using an erase core before recording data into a flexible disk and then writing the new data into the erased area using a read/write core, and an apparatus for effecting the same are disclosed. The erasure by the erase core is done in an AC manner. A gap pattern used to form a gap area is written by the read/write core into a portion of the erased area where no valid data has been written.

9 Claims, 6 Drawing Sheets

APPARATUS FOR AND METHOD OF WRITING/READING DATA INTO/FROM A FLEXIBLE DISK

BACKGROUND OF THE INVENTION

Field of the Invention

The present invention relates to a method of writing/reading data into/from a flexible disk and an apparatus for effecting the same, and more particularly to a method and apparatus suitably for writing/reading data at a high density onto/from a flexible disk.

With conventional flexible disk drives, a recording track on a flexible disk consists of a plurality of sectors and data read/write is done with respect to each of the sectors.

FIG. 1 shows a circular recording track on the flexible disk extended linearly. As seen, one circular recording track on the flexible disk consists of sectors S1 to SN. All these sectors S1 to SN have a format similar to that of the sector S1 which is shown by way of example. Namely, each of the sectors S1 to SN consists of an ID field 101 carrying an address of the sector, and a data field 110 where data are actually written. Further, the ID field 101 has a gap area G2 and an ID area I where the address is written. The data field 110 consists of a gap area G3, data area D where data are actually written, and another gap area G4. In FIG. 1, G1 indicates a leading gap area of the recording track, and G5 indicates the final gap area. The gap areas G1 to G5 serve to prevent any interference between data on the data areas.

The magnetic head of the flexible disk drive is composed of a read/write core and erase cores. FIG. 2 (a) is a perspective view of a conventional magnetic head. As apparent from this Figure, read/write core 203 and erase cores 204a and 204b are provided between sliders 201a and 201b, the slider 201a having a groove 202 formed therein. Also, the read/write core 203 is provided with a read/write coil 205 and a read/write core gap 207. Further, the erase core assembly 204 has an erase coil 206 and erase core gaps 208a and 208b. FIG. 2 (b) is a view, enlarged in scale, of the read/write core gap 207 and the erase core gaps 208a and 208b. When data is to be recorded, the data signal is supplied to the read/write coil 205, so that a magnetic field is produced in the read/write core gap 207. Thus, the data is written on the flexible disk. When a recorded data is to be read from the flexible disk, the data causes the magnetic field in the read/write core gap 207 to be changed. This change of magnetic field is detected by the read/write core 203, producing a read signal in the read/write coil. In FIGS. 2 (a) and (b), the arrow R indicates the revolving direction of the flexible disk.

The erase cores 204a and 204b operate, at the time of a data write, to erase in a DC manner the opposite lateral sides of the data field 110 having been rewritten by the read/write core 203. More specifically, as shown in FIGS. 2 (a) and (b), erase core gaps 208a and 208b are disposed in positions, respectively, slightly displaced from the opposite sides of the read/write core gap 207, so that after the data field 110 within a sector on the recording track of the flexible disk is rewritten, the rewritten data field 110 is erased at the opposite side thereof in DC manner by the erase core gaps 208a and 208b.

The erasure in a DC manner of the rewritten data field 110 at the opposite sides thereof is intended for ensuring the interchangeability of flexible disks between different flexible disk drives. Thus, the data not yet rewritten is prevented from remaining at any one side of the data field 110 in the sector due to any slight positioning error of the magnetic head of the flexible disk drive, and the interchangeability of flexible disk between different flexible disk drives is provided.

FIG. 3 shows in detail the contents of the sector S1 shown in FIG. 1. In FIG. 3, a PLL (phased locked loop) SYNC area PS1 (not shown in FIG. 1) is shown between the gap area G2 and ID area I, and PLL SYNC area PS2 is between the gap area G3 and data area D. These PLL SYNC areas PS1 and PS2 are necessary for putting the synchronization circuit into operation when an address written in the ID area D and data written in the data area D are to be read. Also, FIG. 3 shows an area E having been erased by the erase core gap. The sectors S1 to SN of the above-mentioned configuration are formed in all the recording tracks of the flexible disk through a process called "initialization".

FIG. 4 shows a flexible disk having data previously written in the data area D thereof and which has data in the sectors of the recording track rewritten by another flexible disk drive. In the case where another flexible disk drive is used to write data into a sector, the sector where the data is to be written is sought by reading the ID field of that sector and the predetermined data is written into the data area D of the sector. If there is any slight mismatching of the magnetic head with respect to the recording track, the write position is shifted so that the PLL SYNC area PS2 and data area D are deviated from the other areas as shown. For making such shift allowable, an area to which a new write is made is erased at the opposite sides thereof by the erase head core.

Generally, the distance l between the read/write core gap 207 and erase core gaps 208a and 208b of the magnetic head shown in FIGS. 2 (a) and (b) is selected to be extremely short in order to make the gap areas G1 to G5 shown in FIG. 3 as narrow as possible. The reason why the gap areas G1 to G5 are made narrow is to maximize the recording capacity of the flexible disk. Since the read/write core gap 207 and erase core gaps 208a and 208b are provided in proximity to each other, the following phenomenon will take place when a DC field, required for the erase operating done simultaneously with the data write operation, is applied to the erase core gaps 208a and 208b. Namely, the leakage flux is added to the magnetic flux produced by the read/write core gap 207. Thus, the magnetic flux produced by the read/write core gap 207 according to a write data instruction is disturbed. As a result, when data written on the flexible disk is read by the read/write core 203 to produce a read amplitude, the waveform A is produced as shown by the dash line in FIG. 5. Influenced by the leakage flux from the erase core gaps 208a and 208b which have been described above, the waveform A is deviated from a normal waveform B, free from the leakage flux, which is shown with a solid line in FIG. 5. Consequently, the peaks P1' and P2' of the waveform A are shifted from the peaks P1 and P2 of the waveform B, and this peak shift has been a cause of the misrecognition of reproduced data.

As shown in FIG. 4, the PLL SYNC area PS2 and data area D in each sector of a flexible disk where data have been rewritten are superposed on the data that has previously been recorded; i.e. (what is known as an "overwrite" occurs on the flexible disk. In this case, the area on which data is written will contain an erased area E. As the result, the following problem will arise. Generally speaking, a flexible disk comprises a recording medium of which the coercive force is large to implement a high-density recording. Also, the erased area E is magnetized only in a single direction because it is erased in DC manner by the erase cores 204a and 204b described above. Thus, for overwrite to be made on an erased area E magnetized only in a single direction where the coercive force is large, it is necessary to increase the write current of the read/write core 203. More particularly, it is necessary to produce in the read/write core gap 207 a magnetic flux of a sufficiently high density to write data. However, if a magnetic flux of a sufficiently high density is created in the read/write core gap 207, the magnetic flux will leak at a portion of the read/write core 203, causing a reduction of the resolution of the recording characteristic, with the result that the recording density is decreased.

As described above, the prior art has a problem in that high density recording cannot be attained because of the influence of the addition of the magnetic flux of the erase core gap to that of the read/write core gap and of the influence of the leakage flux from the read/write core.

SUMMARY OF THE INVENTION

Accordingly, the present invention seeks to provide a method of writing/reading data into/from a flexible disk at a high density and, an apparatus for effecting the same.

According to another object of present invention, a method of writing/reading data into/from a flexible disk without misrecognition of reproduced data, and an apparatus for effecting the same are provided.

According to still another object of the present invention, a method of writing/reading data into/from a flexible disk, by which even when a leakage flux from the erase core influences the magnetic field produced by the read/write core, data can be recorded correctly without any shift of the peak of reproduced data from that of the recorded data, and an apparatus for effecting the same are provided.

According to a yet another object of the present invention, a method of writing/reading data into/from a flexible disk, without being adversely affected by any leakage flux from the read/write core, and an apparatus for effecting the same are provided.

According to a still yet another object of the present invention, a method of writing/reading data into/from a flexible disk, by which when data is written into the recording track of a flexible disk, erasure is first made by the erase core along width of the track, and then data is written by the read/write core in the area thus erased.

According to a further object of the present invention, an apparatus for use in a flexible disk drive is provided in which the recording track of a flexible disk is erased by the erase core along width of the track, data is written by the read/write core into the area thus erased, and then a gap pattern is written by the read/write core into an area erased in an AC manner, which remains without any data being written.

These and other objects and advantages of the present invention will be better understood from the ensuing description made, by way of example, of the preferred embodiments with reference to the drawings:

DETAILED DESCRIPTION OF THE PREFERRED EMBODIMENTS

Figure 6A:
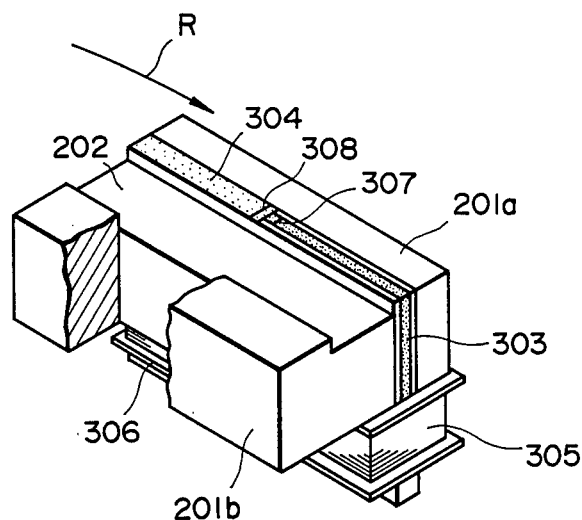
FIG. 6 (a) is a perspective view of one embodiment of the magnetic head used in the present invention, and FIG. 6 (b) shows, as partially enlarged in scale, the magnetic head shown in FIG. 6 (a)
Figure 6B:
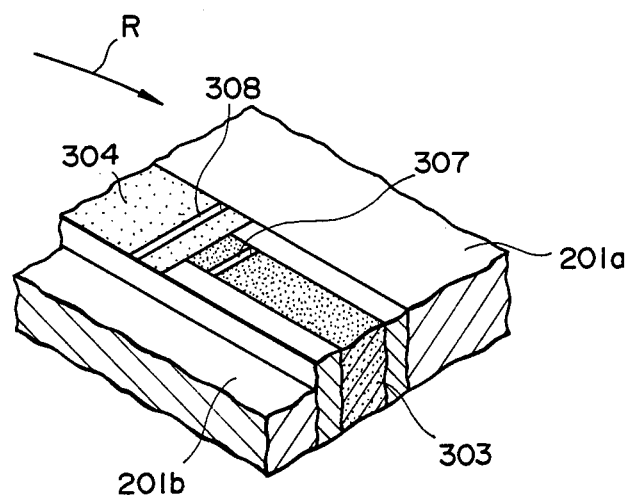

Referring now to FIG. 6 (a), one embodiment of the magnetic head used in the present invention is shown in the form of a perspective view. In this Figure, the similar parts to those used in the conventional magnetic head shown in FIG. 2 (a) are indicated with like reference numerals. The differences between the conventional magnetic head shown in FIG. 2 (a) and the one shown in FIG. 6 (a) are as follows:

First, the magnetic head shown in FIG. 6 (a) is provided with a single erase core 304 which has an erase core gap 308 extending over the width of the recording track. Secondly, the erase core 304 and read/write core 303 of the magnetic head shown in FIG. 6 (a) are disposed opposite to the erase cores 204a and 204b and read/write core 203 of the magnetic head shown in FIG. 2 (a) with respect to the revolving direction of the flexible disk shown by the arrow R. In FIG. 6 (a), 305 indicates a read/write coil, and 306 indicates an erase coil.

Figure 1:
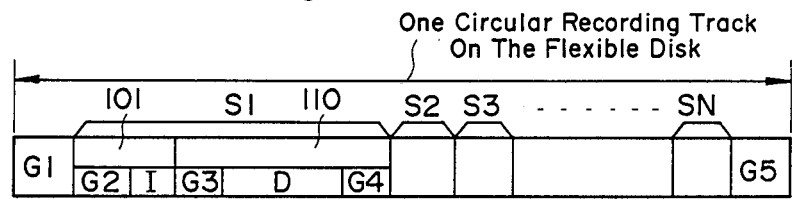
FIG. 1 explains the recording track along the circumference of a flexible disk which is extended linearly.
Figure 2A:
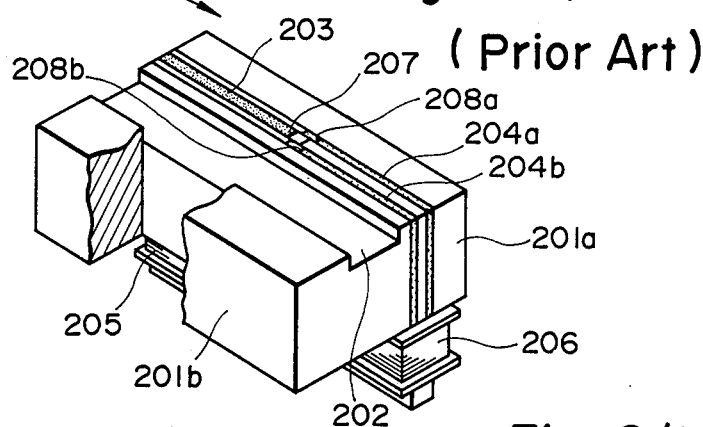
FIG. 2 (a) is a perspective view showing a conventional magnetic head, and FIG. 2 (b) shows, as partially in enlarged scale, the conventional magnetic head shown in FIG. 2 (b)
Figure 2B:
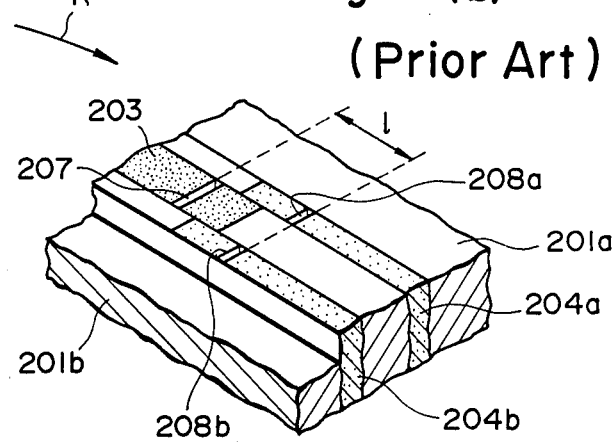
Figure 3:
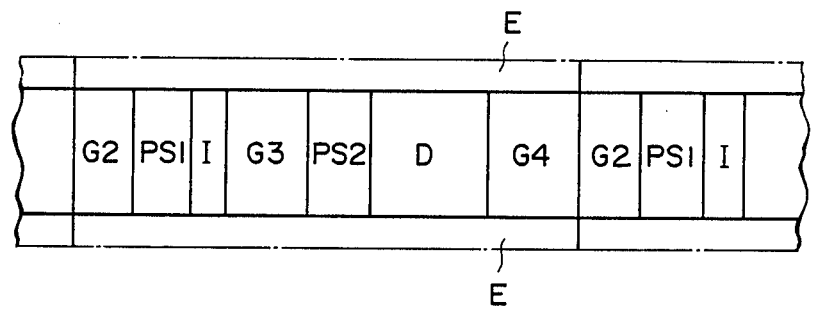
FIG. 3 explains the sectors in the recording track of a flexible disk, which are formed by "initialization"
Figure 4:
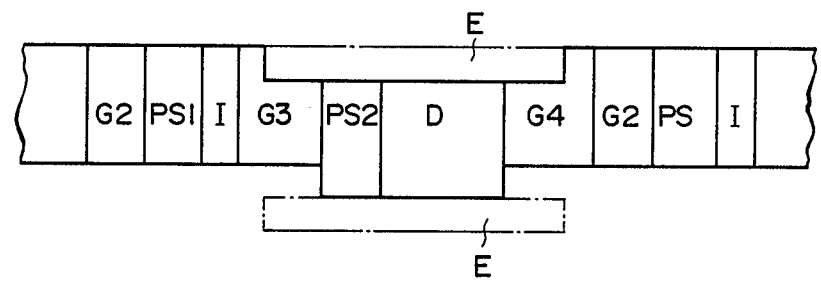
FIG. 4 explains the data recorded in the sector of the recording track of a flexible disk which has been rewritten.

The above two points will be further described with reference to FIG. 6 (b) which shows in enlarged scale parts of the read/write core gap 307 and erase core gap 308. As shown, the erase core gap 308 is extends across the full width of the recording track of the flexible disk, and is not limited at both sides of the read/write core gap 307 as in the conventional magnetic head as shown in FIG. 2(a). First, the erase core gap 308 is disposed in relation to the revolving direction of the flexible disk indicated by the arrow R, followed by the read/write core gap 308. Consequently, when data is to be written onto the recording track of a flexible disk in the present invention, erasure is first made by the erase core gap 308 over the full width of the recording track. Then, data is written by the read/write core gap 307 into the area thus erased.

Figure 7:
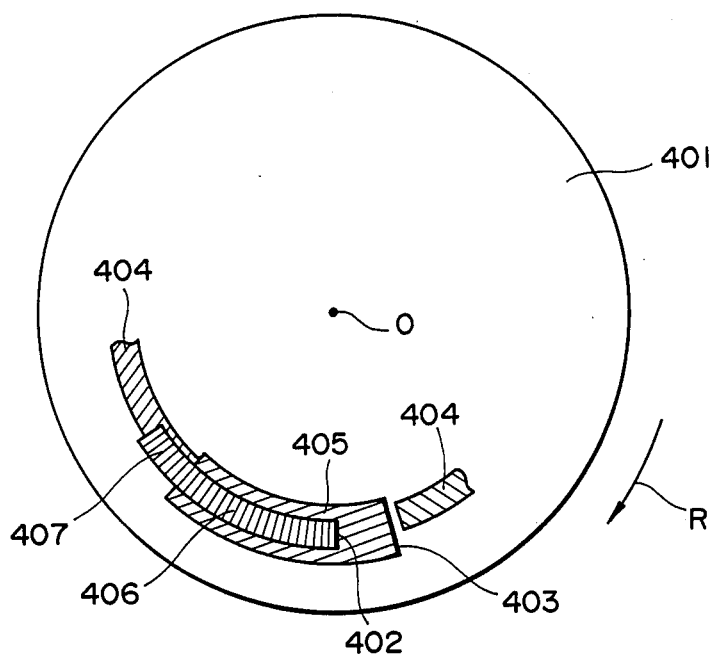
FIG. 7 shows one embodiment of the present invention in which data is written in the recording track of a flexible disk by the inventive method of writing/reading data into a flexible disk.

FIG. 7 explains the recording track when data has been written onto a flexible disk by the magnetic head shown in FIG. 6 (a). As shown the flexible disk 401 revolves around the center of revolution O in the direction of the arrow R. The premagnetized area 404 on the flexible disk 401 where data has been previously written is rewritten as in the following. Simultaneously with the start of erasure in an AC manner by the erase core, the read/write core starts writing data. The erase core gap is disposed in the erase core gap position 403, while the read/write core gap is located in the read/write gap position 402. Therefore, the erase core will erase in an AC manner the premagnetized area 404 where data has been recorded beforehand, to a width equivalent to the erase core gap. As the result, an erased area 405 is formed. Simultaneously with the start of the AC erasure by the erase core, the read/write core will start writing data to the width of the read/write core gap. Thus, a newly magnetized area 406 is formed in which new data is recorded.

Since the read/write core and erase core start the data write and the AC erasure simultaneously, the read/write core writes data in a premagnetized area 404 not erased in an AC manner by the erase core until a predetermined time passes from the start. Thus, the leading portion 407 of the newly magnetized area 406 where new data is written will have a premagnetized area 404 at the end thereof. After a lapse of a predetermined time, the read/write core writes new data into the erased area 405, resulting in a newly magnetized area 406 accompanied by the erased area 405 at the end thereof. Furthermore, the erase core and read/write core stop simultaneously, therefore, the erased area 405 will remain as it is over the full width of the track behind the newly magnetized area 406.

Figure 5:
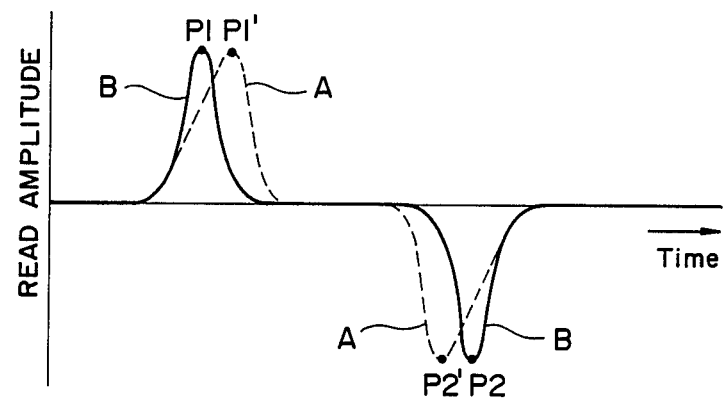
FIG. 5 shows waveforms showing the peak shift of a signal amplitude due to the read/write core.

It should be noted here that the erase core and read/write core are disposed near to each other, so that the addition of the magnetic flux of the erase core gap to that of the read/write core gap will take place as in the prior art. However, this phenomenon will not cause any peak shift of the read amplitude at time of reproduction as in the waveform A shown in FIG. 5. This is because the erasure by the erase core is not done in the conventional DC manner but in an AC manner. More specifically, since the erase core provide the AC erasure for only a very short period and at a high frequency as compared with that of the read amplitude shown in FIG. 5, the data recorded is not adversely affected.

Figure 8:
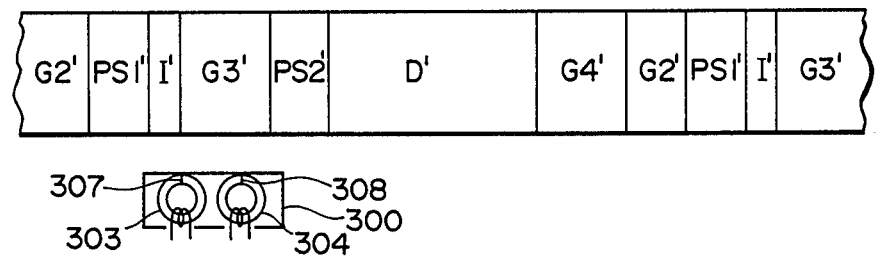
FIGS. 8 (a), (b) and (c) show the writing of data into the recording track on a flexible disk and erasure of data in an AC manner, by the method of writing/reading data into/from a flexible disk and the apparatus for effecting the same according to the present invention.
Figure 8:
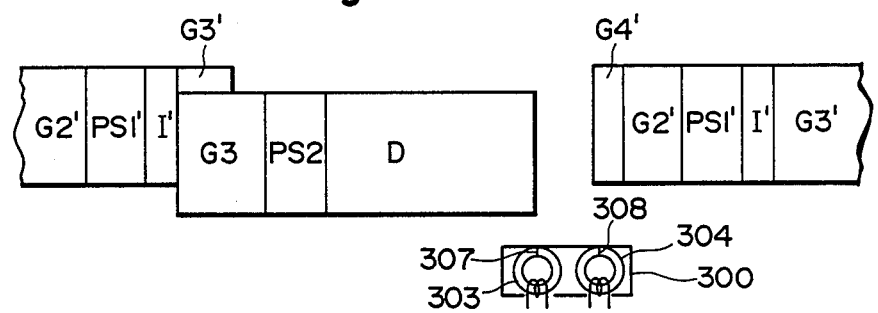
Figure 8:
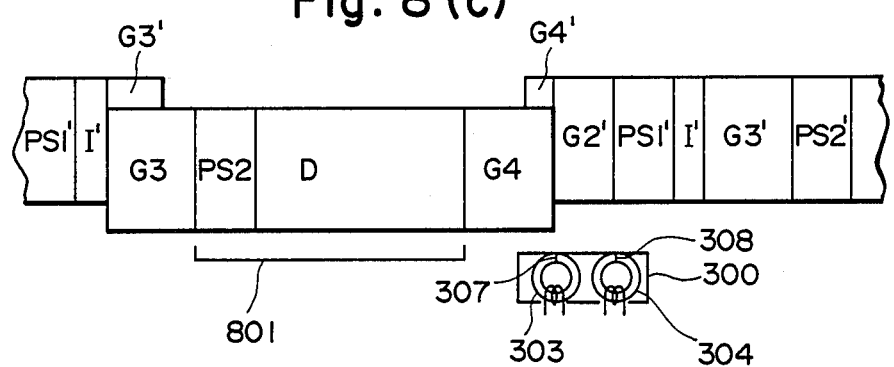

FIG. 8 (a), (b) and (c) show in detail the data write and AC erasure with respect to the recording track of the flexible disk 401. In FIG. 8 (a), (b) and (c), the gap areas G2', G3' and G4', PLL SYNC areas PS1' and PS2', ID are I' and data area D' are already existent in the premagnetized area 404 in which data has been recorded in advance. The write of new data by the magnetic head 300 into the sector shown in FIG. 8 (a) will be described below.

Figure 9:
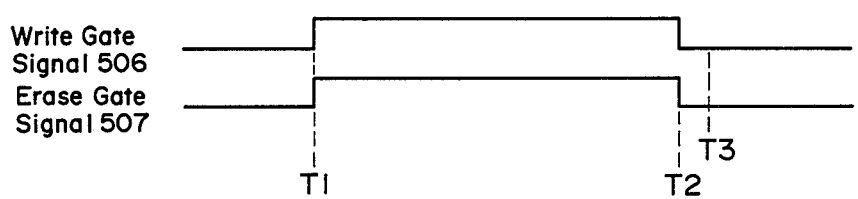
FIG. 9 is a timing chart showing write gate signal and erase gate signal.

As shown in FIG. 8 (a), when the gap area G3' comes to a position opposite to the read/write core gap 307 of the read/write core 303 provided at the magnetic head 300 at the time T1, a signal for formation of a new gap area G3 is delivered from a disk controller (see FIG. 10), such that the read/write core 303 starts forming the new gap G3. At the same time, the erase core 304 starts the erasing operation. The operations of the above-mentioned read/write core 303 and erase core 304 are controlled by the write gate signal 506and erase gate signal 507 delivered at the time T1 from the disk controller as shown in FIG. 9. As shown in FIG. 8 (b), the existing gap area G3' will remain at one side of the newly written gap area G3 until a predetermined time passes from the time T1. After a lapse of a predetermined time, new data will be written in the erased area 405 (see FIG. 7) having been widely erased by the erase core 304, so that the gap area G3' will not remain at the one side of the gap area G3.

As described in the foregoing, the new gap area G3, PLL SYNC area PS2 and data area D are sequentially formed. When the formation of the data area D is complete at the time T2, no more write gate signal 506 and erase gate signal 507 will be delivered from the disk controller as shown in FIG. 9. As a result, the erase core 304 will stop the erasing operation. However, the read/write core 303 will not stop the writing operation and start forming a gap area G4 as shown in FIG. 8 (c). The read/write core 303 will continuously form the gap area G4 until the read/write core gap 307 reaches the gap area G2'.

The gap area G4 is formed for the reason described above. Namely, when the formation of the data area D is complete at time T2, the area between the data area D and gap area G2' is an erased area 405 since it has been erased in an AC manner by the erase core 304 as shown in FIG. 8 (b). Therefore, since there exists no residual magnetization in this area, no effective read amplitude will be delivered even when the read/write core 303 reproduces the above-mentioned area. Thus, phase locking by the PLL (phased locked loop) circuit within the reproduction circuit in the flexible disk drive, and the data reproduction will possibly be adversely affected. To avoid this, after the transfer of any necessary data from the disk controller is complete and a data area D is formed, the gap area G4 is formed. As shown in FIG. 8 (c), the gap area G4 is not included in the reproduction range 801 for the request for data transfer from a disk controller, and this reproduction range 801 consists of the PLL SYNC area PS2 and data area D.

It should be noted here that, as shown in FIG. 8 (b) and (c), the gap area G3' previously formed, gap area G4' previously formed and gap areas G3 and G4 newly developed may possibly interfere with one another at the time of reproduction so that they will possibly be reproduced. However, even if they are reproduced there will be no problem since the read amplitudes of the gap areas G3, G3', G4 and G4' are regarded as invalid data.

As described in the foregoing, in this embodiment, the recording track is first erased in the AC manner to the full width, and new data is written into the area erased in the AC manner. Accordingly, when overwrite is provided by the read/write core in an area having been erased in the AC manner, it can be done with a lower write capability than when overwrite is done in an area erased in the DC manner. Thus, a flexible disk driven can be created which is not influenced by any leakage flux of the read/write core and can record data with high resolution and high density.

Figure 10:
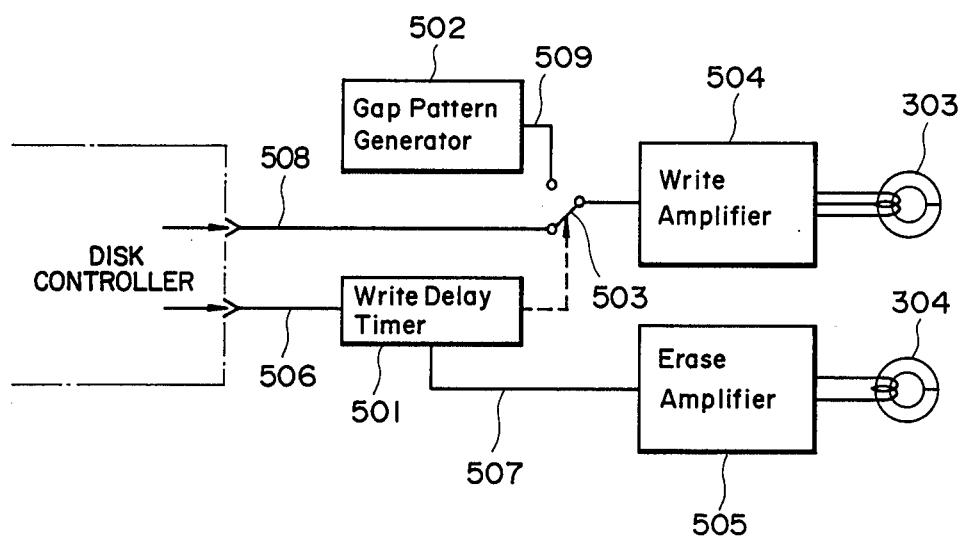
FIG. 10 is a block diagram showing one embodiment of the inventive apparatus for use in a flexible disk drive.

FIG. 10 is a block diagram showing one embodiment of the inventive apparatus for writing and deleting data into/from the above-mentioned flexible disk. When a disk controller delivers a write gate signal 506 to a write delay timer 501, the latter will deliver an erase gate signal 507 to an erase amplifier 505 at the same time. Then, the erase core 304 will start the erasing operation.

At this time, the write data signal 508 delivered from the disk controller is supplied as an input to a write amplifier 504 through a switch 503. Therefore, the read/write core 303 will write into the flexible disk a data corresponding to the write data signal, such as PLL SYNC signal, write data, etc. When the write of the above-mentioned signal is complete and the write gate signal 506 disappears, the write delay timer 501 will not provide any more erase gate signal 507, and the erasure by the erase core 304 will be complete. At the same time, the write delay timer 501 is activated to change the position of the switch 503. In this way, a gap pattern signal 509 delivered from a gap pattern generator 502 is supplied as an input to the write amplifier 504 so that the read/write core 303 will start forming a gap pattern G4 on the recording track. When a predetermined time, namely, a time (T3-T2) shown in FIG. 9, passes, the write delay timer 501 is activated to cause the position of the switch 503 to change to the initial position. Thus, the formation of the gap area G4 is complete. Therefore, the normal operation of the PLL circuit is ensured at the data reproduction, and data can be reliably reproduced.

What is claimed is:

1. A method of writing new data into an intended sector on a recording track of a flexible disk by means of a magnetic head having a read/write core and an erase core disposed prior to said read/write core with respect to the rotation direction of said flexible disk and a control means for selectively applying gap pattern signals and read/write signals to said read/write core, said method comprising the steps of:

forming a new gap area at a position corresponding to an old gap area disposed adjacent to and sequentially after an ID area in the intended sectors on said recording track;

beginning an erase operation of said intended sector at the same time said forming step is begun;

forming a new PLL SYNC area and a new data area continuously after the formation of said new gap area;

stopping said erase operation at a time of completion of the formation of said new data area; and applying a gap pattern signal to said read/write core to form an additional gap area after said new data area in an area including an area not erased by said erase core.

2. A method according to claim 1, wherein said erase operation is provided by said erase core in an AC manner.

3. A method according to claim 1, wherein said erase operation erases the full width of said recording track.

4. A method according to claim 1, wherein said new data includes data to be recorded.

5. A method according to claim 4, wherein said new data area and said new gap area are written into an area erased by said erase operation.

6. An apparatus for processing a write data signal including a first gap pattern signal for forming a first gap pattern, a PLL SYNC signal for forming a PLL SYNC area and write data for forming a data area, delivered from a disk controller at a time when a read/write core transducing gap is located at a gap area disposed adjacent to and sequentially after an ID area in an intended sector on a recording track of a flexible disk, and for processing a write gate signal delivered from said disk controller during a time interval in which said write data signal is delivered from said disk controller, said apparatus comprising:

a write amplifier for amplifying said write data signal and for delivering the amplified write data signal to said read/write core;

an erase amplifier for amplifying an erase signal;

first means for generating a second gap pattern signal for forming a second gap pattern disposed adjacent to and sequentially after a data field in the intended sector of the recording track;

a second means for selectively delivering one of said second gap pattern signal output from said first means and said write data signal delivered from said disk controller to said write amplifier;

a third means responsive to said write gate signal delivered from said disk controller for controlling said selective delivering by said second means; and a fourth means for delivering said erase gate signal to said erase amplifier during a time interval in which said write gate signal is delivered from said disk controller.

7. An apparatus according to claim 6, wherein said third means controls said second means such that said write data signal is delivered from said disk controller while said write gate signal remains turned on, and a gap pattern signal is delivered for a predetermined period of time after said write gate signal is turned off.

8. An apparatus according to claim 6, further comprising an erase core for erasing existing data in an AC manner in response to said erase gate signal.

9. An apparatus according to claim 8, wherein said erase core erases the full width of the recording track.

* * * * *